March 10, 1931. L. LA RIZZA 1,795,610
AMUSEMENT APPARATUS
Filed Jan. 24, 1930
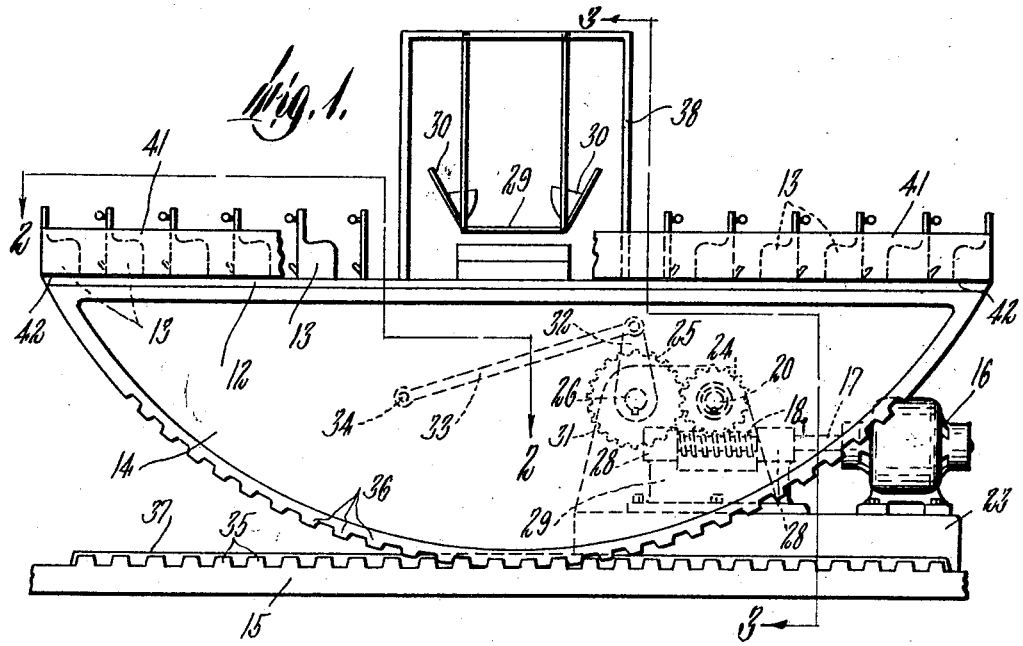
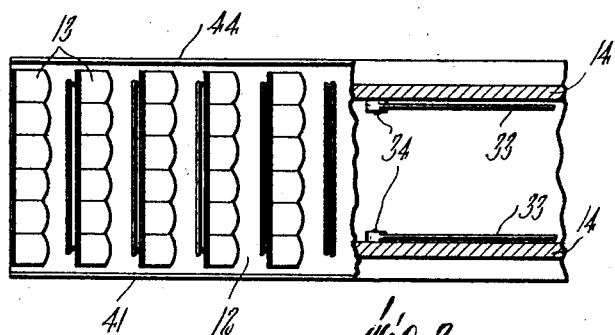
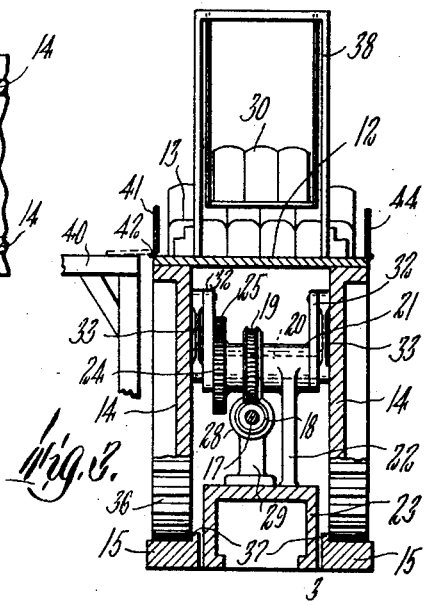
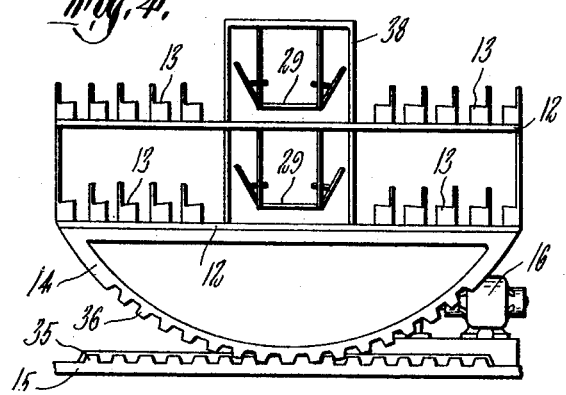
Inventor:
Louis LaRizza,
by Wright Brown Quinby May
Attys.

Patented Mar. 10, 1931

1,795,610

UNITED STATES PATENT OFFICE

LOUIS LA RIZZA, OF REVERE, MASSACHUSETTS

AMUSEMENT APPARATUS

Application filed January 24, 1930. Serial No. 423,044.

This invention has for its object to provide as an amusement apparatus a see-saw or teeter of large carrying capacity, suitable for use at recreation parks and the like, and including a seat-supporting platform having rockers, fixed horizontal base members supporting and permitting rocking movement of the platform and rockers, power mechanism whereby the platform and rockers may be rocked, and simple and effective means for preventing displacement of the platform from a predetermined operative relation to the base members and the power mechanism, a particular object of said means being to prevent a longitudinal creeping displacement, and a lateral displacement of the rockers on the base members.

Of the accompanying drawings forming a part of this specification,—

Figure 1 is a side view of an amusement apparatus embodying the invention.

Figure 2 is a fragmentary plan view, a portion being shown in section on line 2—2 of Figure 1.

Figure 3 is a section on line 3—3 of Figure 1.

Figure 4 is a side view, showing a modification.

The same reference characters indicate the same parts in all of the figures.

In the drawings, 12 designates a platform supporting a plurality of seats 13, preferably arranged in rows, extending crosswise of the platform, as indicated by Figure 2. The platform surmounts and is fixed to longitudinally extending spaced apart rockers 14, having segmental bottom faces. 15 designates fixed spaced apart horizontal base members having supporting top faces on which the bottom faces of the rockers bear, and are adapted to rock to impart a teetering motion to the platform.

Located in fixed relation to the base members is an operating mechanism including a motor 16, preferably of the rotary electric type, and means for imparting a rocking motion from the shaft 17 of the motor, to the rockers and platform. Said means may be organized in any suitable way. In this instance, the motor shaft is journaled in bearings 28, fixed by a standard 29 to a motor base 30.

The motor shaft has a worm 18 meshing with a worm gear 19, fixed to a shaft 20, shown by dotted lines in Figures 1 and 3. The shaft 20 is journaled in a bearing 21, fixed to a standard 22 rising from the motor base 23. To one end of the shaft 20 is fixed a gear 24, meshing with a gear 25, which is fixed to a shaft 26. Said shaft is journaled in a fixed bearing 31 and is provided with crank arms 32 which are connected by rods or links 33 with the rockers 14, the links being pivoted at 34 to the rockers, as shown by Figure 1.

The supporting top faces of the base members 15 are provided with rack teeth 35. The segmental bottom faces of the rockers 14 are provided with gear teeth 36, meshing with the rack teeth 35.

The interengagement of the teeth 35 and 36 prevents longitudinal creeping displacement of the rockers relative to the base members and the operating mechanism, said creeping being often observed when rockers rest without confinement on a horizontal surface, so that there is no liability of injury to or derangement of the apparatus, rendering it inoperative, which would exist if the rockers were allowed to creep.

To prevent lateral displacement or creeping of the rockers relative to the base members and operating mechanism, I provide means preferably embodied in longitudinal confining flanges 37 on the base members engaging side faces of the rockers, as best shown by Figure 3. The base 23 of the operating mechanism and the base members 15 are fixed relative to each other, and may be bolted to a suitable supporting floor or base, not shown.

38 designates a frame fixed to and upstanding from the platform 12, midway between the ends thereof. A swing 39, preferably having opposite seats 30, is suspended from the frame. The rocking motion of the platform 12 oscillates the frame 38, so that the swing is oscillated by gravity.

Figure 3 shows a portion of an elevated fixed platform 40, supported beside the apparatus, and substantially flush with the rocking platform 12 when the latter is horizontal. Patrons may step from the platform 40 to the platform 12, and vice versa, when the platform 12 is at rest and in a horizontal position.

A side guard 41 is hinged at 42 to one longitudinal edge of the platform 12, and is adapted to be releasably supported in the vertical position shown by full lines in Figure 3, and moved to the horizontal position shown by dotted lines to bridge the gap between the platforms 12 and 40. A fixed side guard 44 may be located at the opposite longitudinal edge of the platform.

The apparatus may include a plurality of platforms 12, one above another, as shown by Figure 4.

The rocking motion of the platform 12 has much less amplitude at the central portion than at the end portions, consequently if the central portion of the platform were provided with fixed seats, the occupants thereof would not experience the desired thrill.

This objection is overcome by locating the seats 30 at the central portion of the platform, on the swing 29.

I claim:

1. An amusement apparatus or see-saw comprising a seat-supporting platform, spaced apart rockers fixed to and surmounted by the platform and having segmental bottom faces, spaced apart horizontal base members having supporting top faces on which said bottom faces bear, and operating mechanism including a motor in fixed relation to the base members, and means for imparting a rocking motion therefrom to the rockers and platform, the supporting faces of the base members being provided with rack teeth, and the segmental faces of the rockers with gear teeth meshing with said rack teeth, whereby longitudinal creeping displacement of the rockers relative to the base members and operating mechanism is prevented.

2. A mechanically operated see-saw as specified by claim 1, comprising also means for preventing lateral displacement of the rockers relative to the base members and operating mechanism.

3. A mechanically operated see-saw as specified by claim 1, comprising also longitudinal confining flanges on the base members engaging side faces of the rockers to prevent lateral displacement of the rockers relative to the base members and operating mechanism.

4. A mechanically operated see-saw as specified by claim 1, comprising also a frame fixed to and projecting upwardly from the longitudinal central portion of the platform, and oscillatable by rocking movements thereof, and a swing suspended from the frame and oscillatable by gravity when the frame is oscillated.

In testimony whereof I have affixed my signature.

LOUIS LA RIZZA.